Patented July 11, 1950

2,514,354

UNITED STATES PATENT OFFICE 2,514,354

COPOLYMERS OF ALLYL ESTERS

David E. Adelson and Hans Dannenberg, Berkeley, Calif., assignors to Shell Development Company, San Francisco, Calif., a corporation of Delaware No Drawing. Application November 26, 1946, Serial No. 712,252

3 Claims. (Cl. 260—77.5)

This invention relates to a new class of polymers. More particularly the invention relates to the copolymerization of allyl-type diesters of carbonic acid with allyl-type esters of organic polycarboxylic acids, and to the copolymers thereof.

More specifically the invention may be described as relating to the production of copolymers of allyl-type carbonates and allyl-type esters of organic polycarboxylic acids which possess the highly desired properties of having an increased light stability, a high resistance to the action of acids, alkali, organic solvents, etc., and a hard, flexible surface, which properties are far superior to those of the known resins of the polycarboxylic acids and enable the said polymers to be used for many industrial purposes for which the inferior resins of the art are entirely unsuited.

Allyl-type esters of the organic polycarboxylic acids have in general shown promise in the production of resinous products of commercial value. However, many of the polymers of the organic polycarboxylic acids are highly restricted in their industrial use because of certain undesirable properties which are possessed by various groups of the esters. Polymeric diallyl phthalate, for example, has a low light stability which prevents the resin from being used to produce articles in which a clear color is essential. Diallyl succinate polymerizes to a resin which is soft and which cannot be used to produce any articles that require milling or casting. Polymers of diallyl tartrate have a poor resistance to water, dilute alkali, organic solvents, etc., which prevents use in the production of cups, beakers, interior coatings for tin cans, etc.

The field of application of the resins produced from the allyl-type esters of the organic polycarboxylic acids is thus highly restricted. If new polymers of the esters of the organic polycarboxylic acids could be produced which eliminated the above-described defective properties and combined the special properties of each individual group with those having a hard, flexible surface, high light stability and resistance to acids, alkali and solvents, their production would be a great advancement to the art, and the industrial fields of the said resins would be greatly expanded.

It is an object of the invention, therefore to provide polymers of the allyl-type esters of the organic polycarboxylic acids which possess the above-described properties as well as many of their own characteristic qualities and can thus be applied to a highly expanded field of commercial uses. It is a further object of the invention to provide for the copolymerization of allyl-types diesters of carbonic acid with allyl-type esters of organic polycarboxylic acids and for the copolymers thereof. Other objects of the invention will be apparent from the detailed description given hereinafter.

It has now been discovered that allyl-type esters of the organic polycarboxylic acids may be copolymerized with allyl-type diesters of carbonic acid to produce products having a high light stability, a high resistance to acids, alkali and organic solvents, and having a hard, flexible surface as well as retaining properties of the polymeric allyl-type esters of polycarboxylic acids being polymerized. Such polymers can be used in many industrial applications requiring the use of a clear colored resin or one that is stable against the action of acids and hot water, or one that must be milled, lathed or drilled. The discovery that the copolymerization of the allyl-type diesters of carbonic acids with the organic polycarboxylic acid esters produces polymers having the above described properties was surprising in view of the fact that the polymers of the allyl-type diesters of carbon acid alone possess a brittle surface with a relatively low resistance to light and heat.

The compounds to be copolymerized with the allyl-type esters of organic polycarboxylic acids to produce the superior resins of the invention may be broadly described as allyl-type diesters of carbonic acid. More specifically they may be described as esters of carbonic acid in which both of the hydroxyl groups are esterified by allyl-type alcohols. The compounds may be more fully described by the following structural formula

wherein R and R₁ are the same or different allyl-type radicals.

By the term "allyl-type" radical as used throughout the specification and appended claims is meant those radicals having an unsaturated linkage, preferably a double bond, between two carbon atoms of aliphatic character, one of which is attached directly to a saturated carbon atom from which stems the free valence of the radical. The carbon atoms of aliphatic character are the carbon atoms in an open chain, for example, the carbon atoms in aliphatic radicals, and also the carbon atoms in cycloaliphatic radicals, for example, the carbon atoms in the cyclohexyl and cyclohexenyl radicals. Allyl-type radicals have the structure

wherein each $R_2$ is the same or different substituent of the group comprising the hydrogen atom, a halogen atom, or an organic radical. Especially advantageous are the radicals of this type having a terminal methylene group, i. e., radicals having the structure

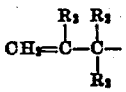

wherein each $R_2$ is the same or different substituent of the group comprising the hydrogen atom a halogen atom or an organic radical.

In lieu of the structural formulae the allyl-type alcohols may be specifically described as beta-gamma unsaturated alcohols wherein the carbon atom bearing the hydroxyl group is termed the alpha carbon atom and is directly joined to the beta carbon atom bearing the unsaturated linkage.

Preferred organic radicals which $R_2$ may represent in the above formula of the allyl-type radical are the hydrocarbon radicals containing from 1 to 18 carbon atoms. Such preferred radicals are monovalent and may be substituted or unsubstituted, saturated or unsaturated, cyclic, alicyclic or aromatic. Representative examples of the preferred radicals are methyl, ethyl, propyl, n-butyl, isobutyl, n-pentyl, 2-chloroethyl, hexyl, 2,4-dichlorocyclohexyl, 2,3,5-trimethyldecyl, methyl vinyl carbinyl, phenyl, tolyl, anthryl, 3-bromo-2-cyclohexenyl, 3-vinyl-2-cyclohexenyl, 2-chlorocyclopentyl, etc.

Representative examples of the preferred allyl-type radicals represented by R and $R_1$ of the structural formula of the allyl-type diesters of carbonic acid are allyl, methallyl, methyl vinyl carbinyl, ethyl vinyl carbinyl, propyl vinyl carbinyl, ethallyl, propallyl, methyl isopropenyl carbinyl, isobutenyl carbinyl, 2,4-hexadien-yl-1, 2,3,-butadien-yl-1, chloro-methallyl, 3-bromo-2-cyclohexen-yl-1, etc. Such radicals are practically or theoretically derived from allyl-type alcohols such as allyl alcohol, methallyl alcohol, ethallyl alcohol, 2-buten-1-ol, 2-hexen-1-ol, 3-methyl-2-buten-1-ol, 4,4-dimethyl-2-penten-1-ol, etc.

The following list contains a few representative examples of the allyl-type diesters of carbonic acid suitable for use in the process of the invention:

Diallyl carbonate
Dimethallyl carbonate
Di(2-chloroallyl) carbonate
Dicrotyl carbonate
Allyl methallyl carbonate
Di(2,2-dichloro-3-butenyl) carbonate
Methallyl propallyl carbonate
Di(ethyl vinyl carbinyl) carbonate
Di(2,4-hexadienyl) carbonate
Di(ethyl isopropenyl carbinyl) carbonate The allyl-type diesters of carbonic acid may be produced by any suitable method. The instability of carbonic acid prevents its use in the production of the carbonates of the allyl alcohols. Most of the methods, therefore, involve the use of a stable derivative of carbonic acid such as carbamic acid esters or salts, urea, urethane, carbonyl chloride, chloroformate, etc. One method, for example, is to treat carbonyl chloride with a double molar quantity of the allyl-type alcohol so that both of the chlorine groups are replaced by allyl-type radicals.

The preferred method, however, for the production of the carbonates of the allyl-type alcohols, because of its efficiency and relatively low costs, is the treating of the allyl-type alcohol with an alkyl diester of carbonic acid, preferably diethyl carbonate, under such conditions that there is an exchange of the allyl-type radical for the alkyl groups of the alkyl diester of carbonic acid. The reaction may be illustrated by the following equation showing the production of diallyl carbonate

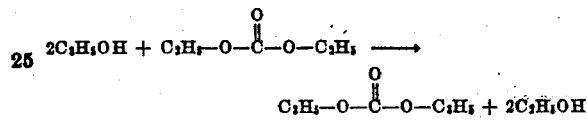

In selecting an alkyl diester of carbonic acid to use in the reaction it is advisable to select one which will produce an alkyl alcohol with a boiling point much lower than the allyl-type carbonate being formed in order that the low-boiling alkyl alcohol may be readily driven off and the reaction carried to completion.

In the preferred process, illustrated by the above equation, the proportions of the reactants used may vary over a wide range. If the carbonic acid is to be esterified by two molecules of the same allyl-type it is usually advisable to use slightly more than a double molar quantity of the allyl-type alcohol. If the carbonic acid is to be esterified by two different types of allyl-type alcohols only a slight molar excess of the alcohols may be used. The reaction proceeds very smoothly, however, when the alkyl diester of carbonic acid is in excess.

The process is preferably conducted in the presence of a catalyst. Generally any of the known catalysts used to speed up the esterification process may be used. Suitable catalysts being sodium methoxide, potassium ethoxide, ammonia, pyridine, p-toluene sulfonic acid, benzene sulfonic acid, etc. The more preferred catalysts are the alcoholates of the alkali metals such as sodium, potassium, lithium, etc., and the lower alcohols such as methyl, ethyl, butyl, isobutyl, propyl, etc. alcohols. When such catalysts are used, however, they must be maintained in the anhydrous conditions as they are readily hydrolyzed by water and will disappear in the saponification of the diester.

The amount of the catalyst used will depend upon the derivative of carbonic acid used, the esterification constant of the unsaturated, dihydric alcohol and the speed of the reaction desired. In general, amounts of catalysts ranging from .1 to 2 moles for every 100 moles of alkyl diester of carbonic acid used in the process are employed. In most cases approximately one mole of catalyst per 100 moles of alkyl diester of carbonic acid will be sufficient for a normal reaction. The exact amount of catalyst to be used in each case, however, will depend upon the specific conditions of each reaction.

Although the preferred reaction may be carried out without the addition of solvents, it may, in some cases, be advantageous to conduct the reaction in the presence of a mutual solvent. Suitable solvents for the reaction are benzene, hexene, dioxane, pentane, etc., or mixtures thereof.

The temperature at which the preferred reaction may be carried out may vary as required by the nature of the reacting substances. In most cases the reaction may commence at a temperature as low as about 50° C. In general the maximum temperature will not exceed about 200° C. but some cases may require a temperature above that range. A preferred temperature range is between about 60° C. and about 160° C. However, higher or lower temperatures may be used if needed or desired.

The time of the reaction will vary according to the type and amount of catalyst used, the temperature of reaction and the specific reactants being employed. In general the reaction time will lie between about 3 to 8 hours. However, longer and shorter periods may be used and the exact time will be determined for each specific case.

The preferred reaction should be conducted under a blanket of an inert gas in order to avoid exposure of the reaction to air and oxygen. Nitrogen is the more preferred of the inert gases to be used as the blanket. Carbon dioxide may be used in cases other than those employing an alkaline catalyst such as sodium ethoxide. Atmospheric, reduced or superatmospheric pressures may be used.

The reaction is executed in any convenient type of apparatus enabling intimate contact of the reactants, refluxing of the reaction mixture and later removal of the low boiling alcohol by distillation. The process may be carried out in batch, semi-continuous or continuous operation.

Upon completion of the reaction the low-boiling alcohol is first removed from the reaction mixture by means of distillation and carbonate of the allyl-type alcohols is then removed from the reaction charge, which will generally include the catalyst and the excess of the reactants, by any suitable means comprising such steps as, for example, distillation, washing, solvent extraction, filtration, and the like.

The allyl-type esters of organic polycarboxylic acids with which the above-described allyl-type diesters of carbonic acid are polymerized to produce the superior resins of the invention may be broadly described as esters of allyl-type alcohols and organic carboxylic acids containing two or more carboxyl groups. The allyl-type alcohols with which the polycarboxylic acids are esterified may be described as having the general formula

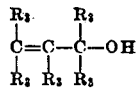

wherein each $R_3$ is the same or different substituent of the group comprising the hydrogen atom, a halogen atom, or an organic radical. Preferred organic radicals which $R_3$ may represent are the hydrocarbon radicals which may be substituted or unsubstituted, saturated or unsaturated, cyclic, alicyclic or aromatic. Representative examples of the hydrocarbon radicals methyl, ethyl, n-butyl, 3-chlorobutyl, octyl, 2,4-dichlorocyclohexyl, 2,3,5-trimethyldecyl, methyl vinyl carbinyl, phenyl, tolyl, 2-chloro-cyclopentyl, etc. $R_3$ may also represent heterocyclic radicals wherein the ring contains oxygen, sulfur, or nitrogen atom or atoms such as the furfuryl, thiophenyl, sulfolanyl and pyridinyl radicals.

The more preferred allyl-type alcohols are those having the above-described general formula wherein $R_3$ is a hydrocarbon radical containing from 1 to 15 carbon atoms. Examples of such preferred alcohols are allyl alcohol, methallyl alcohol, propallyl alcohol, methyl vinyl carbinol, propyl vinyl carbinol, 2-butenol-1, 2-pentenol-1, phenyl vinyl carbinol, cyclohexyl vinyl carbinol, etc.

The organic polycarboxylic acid used to esterify the allyl-type alcohols may be saturated or unsaturated, cyclic, alicyclic or aromatic and may be substituted or unsubstituted. Examples of the polycarboxylic acids are malonic acid, succinic acid, 2-chloro-1,3-propanedicarboxylic acid, glutaric acid, adipic acid, 3-methyl-4-ethyl-1,4-dicarboxylic acid, cyclobutane-1,2-dicarboxylic acid, cyclobutane-1,3-dicarboxylic acid, 2-cyclohexene-1,2-dicarboxylic acid, cyclopentane-1,2,4-tricarboxylic acid, phthalic acid, hydrophthalic acid, naphthalene-1,3-dicarboxylic acid, fumaric acid, oxalic acid, tartaric acid, malic acid, diglycollic acid, sulfonyl dihydracrylic acid, azelaic acid, sebacic acid, decamethylene dicarboxylic acid, thapsic acid, rocellic acid, methyl pimelic acid, alpha,alpha - dimethyl - gamma - methyl adipic acid, etc. Each of the carboxyl groups of the polycarboxylic acids may be esterified by the same or different allyl-type alcohols discussed hereinabove.

A preferred group of the organic polycarboxylic acids are the substituted or unsubstituted aromatic acids such as phthalic acid, isophthalic acid, terephthalic acid, tetrachlorophthalic acid, tetrachloroisophthalic acid, tetrabromoterephthalic acid, tetrabromoisophthalic acid, etc.

The allyl-type esters of the organic polycarboxylic acids may be produced by any of the known esterification methods. They may be produced, for example, by treating the anhydrides, halides of the polycarboxylic acids with the desired allyl-type alcohol under the known esterification conditions. They also may be produced by the ester exchange method discussed hereinabove for the production of the allyl-type diesters of carbonic acid.

Representative examples of the allyl-type esters of organic polycarboxylic acids suitable for use in the process of the invention are:

Diallyl succinate
Dimethallyl glutarate
Diallyl diglycollate
Di(2-pentenyl) phthalate
Diallyl phthalate
Di(phenyl vinyl carbinyl) isophthalate
Di(3-chloro-2-hexenyl) tartarate
Allyl methallyl adipate
Diallyl tetrachlorophthalate
Di(cyclohexyl vinyl carbinyl) sebacate
Di(4-nitro-heptenyl) azelate Any of the above-described allyl-type diesters of carbonic acid may be copolymerized with any of the allyl-type esters of the organic polycarboxylic acids to produce resinous products having the desired properties. The allyl-type diesters of carbonic acid and the allyl-type esters of organic polycarboxylic acids used in producing the resins of the invention may be in the monomeric state or may be partially polymerized prior to being copolymerized with the other component. By the term "partially polymerized" as used throughout the specification and appended claims is meant any state of polymerization existing between the monomeric state and the state of substantially complete polymerization. In accordance with a provision of the invention polymerized diallyl carbonate may be copolymerized with monomeric dimethallyl tartarate, for example, or monomeric dimethallyl carbonate may be copolymerized with partially polymerized diallyl phthalate to produce resins having the desired properties.

The partial polymerization of the monomeric allyl-type diesters of carbonic acid and the monomeric allyl-type esters of the organic polycarboxylic acids may be accomplished by the use of any of the known methods of polymerization and by the interruption of the process at any time short of its completion. The diesters of carbonic acid and the esters of the polycarboxylic acids may be partially polymerized, for example, by exposing the monomer to heat or light at temperatures between about 60° C. to about 160° C. in the presence or absence of polymerization catalysts such as benzoyl peroxide and interrupting the process after a short period of exposure.

The allyl-type diesters of carbonic acid and the allyl-type esters of organic polycarboxylic acids may be copolymerized alone or may be incorporated with other unsaturated organic compounds. Examples of such unsaturated organic compounds are the vinyl-type esters of the carboxylic acids such as divinyl citrate, vinyl acrylate, divinyl phthalate and the vinyl-type polyethers of saturated polyhydric alcohols such as divinyl glycol, divinyl diethylene glycol, trivinyl glycerol, etc.

The copolymers of the invention may also be polymerized in the presence of already-formed plastics, including natural resins, cellulose derivatives and synthetic resins. Other modifiers, including plasticizers, stabilizers, lubricants, dyes, pigments and fillers, may be added to the mixture prior to polymerization or may be added during the polymerization process provided they do not chemically react with or otherwise adversely affect the ingredients of the reaction mixture. Otherwise, these modifiers may be added following polymerization. The nature and amount of the modifiers will depend upon the particular compounds involved, upon the method of polymerization and upon the intended use of the product.

The proportion of the allyl-type diesters of carbonic acid and the allyl-type esters of organic polycarboxylic acids to be copolymerized will vary over a wide range depending upon the specific reactants and the type of product desired. Resinous products having increased light stability and increased resistance toward acids and alkali are obtained when the amount of the allyl-type diester of carbonic acid to be used varies within the range of 5% to about 95% by weight of the total reactants and the allyl-type esters of organic polycarboxylic acids vary of 95% to about 5% by weight of the total reactants. Resinous products having exceptionally fine properties with a particularly fine resistance to the action of acids, alkali and water and the discoloration of light are obtained when the amount of the diester of carbonic acid incorporated with the allyl-type ester of organic polycarboxylic acid to produce the resin varies within the range of 45% to about 55% of the total weight of the reactants, preferably about 50% of the total weight of the reactants and the allyl-type ester of organic polycarboxylic acids making up the other 55% to about 45% of the total weight. The specific amount of the reactants to be used to bring out the desired properties, however, can readily be determined for each individual case.

The compound may be polymerized in bulk in the presence or absence of a solvent or diluent. If a solvent is used the substance may be a solvent for the reactants and polymer, or may be a solvent for the reactants and a non-solvent for the polymer. Emulsifying, granulating and wetting agents may also be present. It is also possible to effect polymerization by atomizing the reactants or solution thereof in the form of a fine spray into a heated chamber containing an inert gas. It is likewise feasible to polymerize the novel compounds of the invention dispersed in the interstices in fibrous material such as fabric.

The polymerization of the allyl-type diester of carbonic acid and the allyl-type ester of polycarboxylic acids is usually energized by the application of heat, although both heat and light may be used, and in some cases, light is sufficient. Temperatures between about 60° C. and about 160° C. are preferred, although higher or lower temperatures can be used. The time of the polymerization treatment will vary depending upon the particular compounds being polymerized, the method of polymerization and the degree of polymerization desired and the intended use of the product.

Atmospheric, reduced, or superatmospheric pressures may be used in the polymerization process. The process may also be carried out under a blanket of an inert gas such as nitrogen or carbon dioxide.

Catalysts may be added to hasten the polymerization. The preferred catalysts are those which are soluble in the polymerizable compounds. Benzoyl peroxide has been found very satisfactory. Other polymerization catalysts are acetyl peroxide, benzoyl acetyl peroxide, launyl peroxide, dibutyryl peroxide, succincyl peroxide, sodium peroxide, barium peroxide, tertiary alkyl hydroperoxides such as tertiary butyl hydroperoxide, peracetic acid, perphthalic acid, etc. If desired, mixtures of the polymerization catalysts may be used. The amount of the catalyst used will vary under the various conditions but ordinarily will be between about 0.01% and about 5% by weight of the material being polymerized, although it is not necessary to limit this range. In some cases it may be desirable to conduct the polymerization in the concurrent presence of both a catalyst and an inhibitor of polymerization for the purpose of controlling the rate thereof or of producing a product of certain desired properties.

The polymerization reaction can be carried to completion without substantial interruption or it may be stopped at any point short of completion. Incomplete polymerization may be used for the production of a syrup which may be further worked and eventually substantially completely polymerized. The syrup may, for instance, be transferred to a mold of any desired configuration and again subjected to polymerization conditions. The unreacted materials may be separated from the polymer by solvent extraction, distillation or other methods. The separated polymer may then be worked up in any known or special manner.

The resinous products of the invention are characterized by their high quality light stability, their resistance to the action of acids, alkali, organic solvents, etc. and by their hard, flexible surface. When completely polymerized the resins may be made in the form of turnery shapes, sheets, rods, tubes, thin films, filaments, fibers, etc. Their resistance to acids and alkali make them particularly desirable as interior coatings for cans to be used for storing fruit, juices etc. When used for this purpose the partly polymerized syrup may be placed on the tin surface and then completely polymerized to a hard surface by the application of heat. The resins find further use in the production of cups, beakers, boxes and other flexible containers. They may also be used in the production of various types of glass substitutes. In the form of the partly polymerized syrup they may be used in the preparation of laminates, or as plasticizers, ingredients of pains, enamels, textile assistants, etc.

To illustrate the manner in which the invention may be carried out the following examples are given. It is to be understood, however, that the examples are for the purpose of illustration and the invention is not to be regarded as limited to the specific allyl-type diester of carbonic acid or the specific allyl-type ester of polycarboxylic acid being polymerized.

Example I

Approximately 181 parts of clean sodium is cut into small pieces and added to about 4270 parts of absolute ethyl alcohol under a reflux condenser. After all the sodium is dissolved and the solution has cooled somewhat, about 13,370 parts of dry allyl alcohol is added to the mixture following which about 9080 parts of diethyl carbonate is added. The reaction charge is then refluxed under a good column and the ethyl alcohol is taken off overhead. The residue is then taken up in benzene and water. The aqueous layer is separated and the benzene layer is water-washed several times. The benzene is then distilled off at atmospheric pressure to give a residue which is largely diallyl carbonate. The residue is distilled under reduced pressure of 57–61 mm. Hg at 95–97° C. to give a colorless liquid ($n_D^{20}$, 1.4288) identified as diallyl carbonate.

Approximately equal parts of the diallyl carbonate and diallyl phthalate are mixed together with 2% by weight of benzoyl peroxide and heated to 65° C. for 5 days. The resulting resin possesses a hard, flexible, clear surface.

Another resin is produced by combining about 10 parts by weight of diallyl carbonate and about 90 parts by weight of diallyl phthalate with about 2% by weight of benzoyl peroxide and heating the mixture at 65° C. for 5 days. The resulting resin also possesses the desired properties of having a hard, flexible, clear surface.

In order to test the special properties of the resins the following tests are performed on samples of the resins applied to metal strips:

*Light test.*—Strips of the resin are exposed on the roof of the laboratory building in a south direction and under an angle of 45° C., and inspected frequently for signs of discoloration.

*Acid test.*—A drop of 35% sulfuric acid is applied on the surface of a strip of the resin and the time of gas evolution observed. Rapid failure indicates porosity or inhomogeneity of the film; failure after a few hours indicates permeability of the film.

*Alkali test.*—A strip of the resin is weighed and then immersed in a 10% potassium hydroxide solution at room temperature. The solution is stirred at 2 hour intervals. At the end of 24 hours the strip is removed and weighed. Loss of weight and change of appearance indicates alkali action.

The copolymers of the diallyl carbonate and diallyl phthalate produced above are subjected to the above tests and it is found that even after a considerable period of treatment there is no discoloration of the resins by light and the acid and alkali have shown no action on the surface of the resins.

Example II

Approximately equal parts of the diallyl carbonate produced in Example I and diallyl diglycolate are mixed together with 2% by weight of benzoyl peroxide and heated to 65° C. for 5 days. At the end of the period a hard, clear resin is obtained which shows no discoloration or action of acid or alkali after being subjected to the above tests.

Example III

Approximately 5.18 parts of clean sodium is cut into small pieces and added to about 120 parts of absolute ethyl alcohol under a reflux condenser. After all the sodium is dissolved and the sloution has cooled, about 907 parts of beta-chloroallyl alcohol and about 490 parts of diethyl carbonate are added to the reaction charge. The mixture is then refluxed under a good column for several hours. The low boiling ethyl alcohol is then distilled off overhead. The residue is taken up in benzene and water. The aqueous layer is separated and the benzene layer is water-washed several times. The benzene is then distilled off at atmospheric pressure to give a residue which is largely di-beta-chloroallyl carbonate. The residue is distilled under reduced pressure to give a colorless liquid identified as di-beta-chloroallyl carbonate.

About 10 parts of di-beta-chloroallyl carbonate is copolymerized with approximately 90 parts of dimethallyl glutarate and 2% benzoyl peroxide at 65° C. for 5 days. At the end of the polymerization period a firm flexible, clear resin is obtained which shows no discoloration or action of acid or alkali after being subjected to the above tests.

Example IV

About 181 parts of clean sodium is added to about 4270 parts of absolute methyl alcohol under a reflux condenser. To this solution is added about 13,370 parts of dry methallyl alcohol and about 9080 parts of diethyl carbonate. After the reaction has refluxed for several hours the ethyl alcohol is driven off and the residue taken up in benzene and water. The benzene solution is water-washed several times and then distilled to remove the benzene. The residue is distilled under reduced pressure of 61 mm. Hg to give clear liquid of dimethallyl carbonate.

About 70 parts of dimethallyl carbonate so produced is then copolymerized with about 30 parts of dimethallyl tetrachlorophthalate and 2% benzoyl peroxide at 65° C. for 4 days. At the end of the heating period a hard, clear resin is obtained which shows no discoloration or action of acid or alkali after being subjected to the above tests.

Example V

Approximately 55 parts of dimethallyl carbonate produced according to the procedure of Example IV is copolymerized with about 45 parts by weight of the following compounds, dimethallyl succinate, allyl methallyl adipate, diallyl sebacate, dimethallyl azelate, di(3-chloro-2-hexenyl) tartrate, dipropallyl isophthalate and diallyl adipate. The resin produced in each case had a firm surface which was not affected by the light, acid or alkali test discussed above.

We claim as our invention:

1. A resin comprising a copolymer of 45% to 55% of diallyl carbonate and 55% to 45% of an ester from the group consisting of diallyl adipate and a diallyl ester of a mononuclear aromatic dicarboxylic acid.

2. A resin comprising a copolymer of 45% to 55% of diallyl carbonate and 55% to 45% of diallyl phthalate.

3. A resin comprising a copolymer of 45% to 55% of diallyl carbonate and 55% to 45% of diallyl adipate.

DAVID E. ADELSON.
HANS DANNENBERG.

REFERENCES CITED

The following references are of record in the file of this patent:

UNITED STATES PATENTS

| Number | Name | Date |
| --- | --- | --- |
| 2,403,112 | Muskat | July 2, 1946 |